(12) United States Patent
Backer et al.

(10) Patent No.: US 8,506,408 B2
(45) Date of Patent: Aug. 13, 2013

(54) SYSTEM AND METHOD FOR COLLABORATION

(75) Inventors: Jonathan Backer, Burbank, CA (US); Thomas R. Smith, Thousand Oaks, CA (US)

(73) Assignee: Disney Enterprises, Inc, Burbank, CA (US)

( * ) Notice: Subject to any disclaimer, the term of this patent is extended or adjusted under 35 U.S.C. 154(b) by 3 days.

(21) Appl. No.: 13/172,404

(22) Filed: Jun. 29, 2011

(65) Prior Publication Data
US 2011/0319173 A1    Dec. 29, 2011

Related U.S. Application Data

(60) Provisional application No. 61/359,744, filed on Jun. 29, 2010.

(51) Int. Cl.
*G06F 17/00*     (2006.01)
(52) U.S. Cl.
USPC .............................................. 463/42; 463/39
(58) Field of Classification Search
USPC ...................................................... 463/16–43
See application file for complete search history.

(56) References Cited

U.S. PATENT DOCUMENTS

| 8,262,482 | B2* | 9/2012 | Kamikawa et al. | 463/42 |
|---|---|---|---|---|
| 2005/0159221 | A1* | 7/2005 | Kamikawa et al. | 463/42 |
| 2010/0081501 | A1* | 4/2010 | Carpenter et al. | 463/30 |
| 2010/0153848 | A1* | 6/2010 | Saha | 715/721 |
| 2010/0331079 | A1* | 12/2010 | Bytnar et al. | 463/29 |
| 2011/0021275 | A1* | 1/2011 | Kamikawa et al. | 463/42 |
| 2011/0053173 | A1* | 3/2011 | Hood et al. | 435/7.1 |
| 2011/0319173 | A1* | 12/2011 | Backer et al. | 463/42 |

\* cited by examiner

*Primary Examiner* — Masud Ahmed
(74) *Attorney, Agent, or Firm* — Patterson & Sheridan LLP

(57) ABSTRACT

Techniques are disclosed for facilitating a shared activity conducted by multiple participants via remote devices, particularly when there are more players then available remote devices. For example, the shared activity may be users playing electronic versions of a variety of card games or board games (or other game types). Users interact with a central device and one or more remote devices. The central device may be used to present "public" information on a central game play field—such as a game board, draw and discard piles, place cards, current scores, whose turn it is, etc. And the remote devices are used to present "private" game information to individual players—such as a player's "hole cards" or letter tiles. Further, users may make game choices and provide game input by interacting with the handheld device.

19 Claims, 7 Drawing Sheets

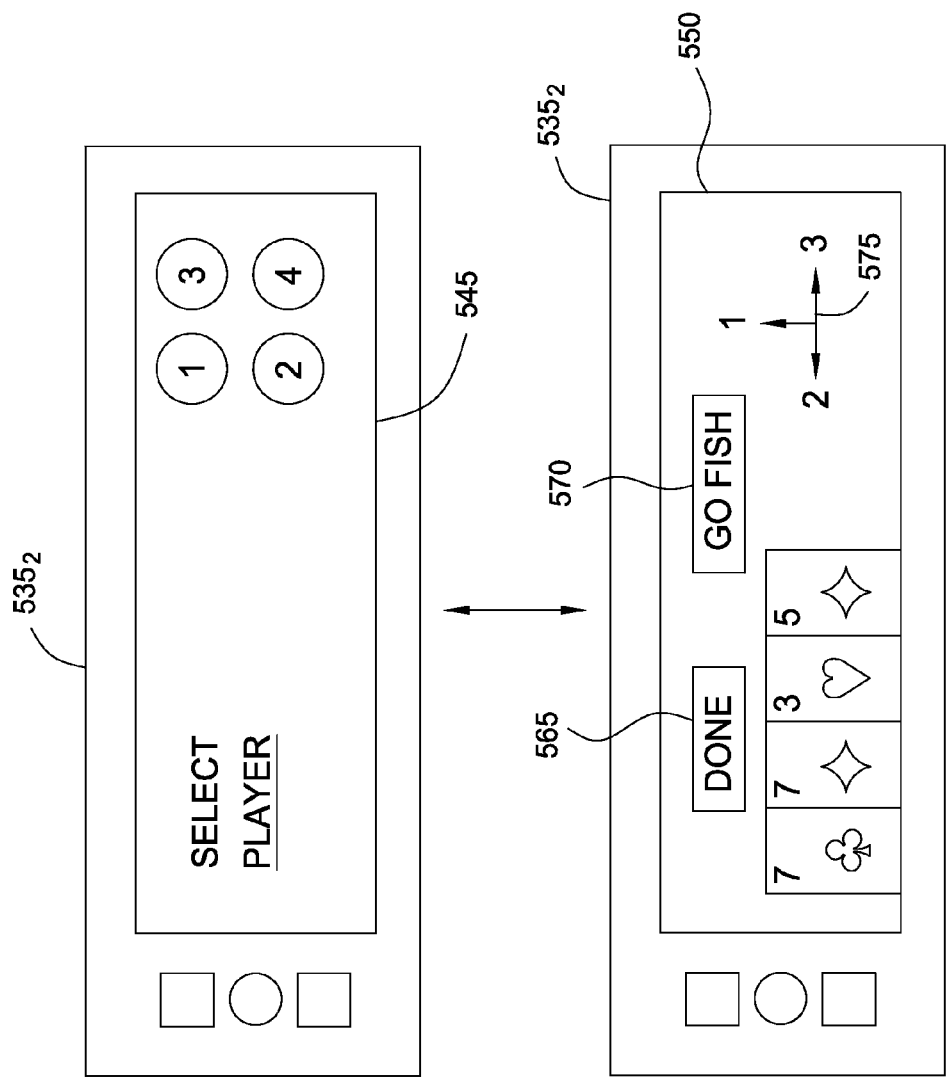

SYSTEM AND METHOD FOR COLLABORATION

CROSS-REFERENCE TO RELATED APPLICATION

This application claims benefit of U.S. Provisional Patent Application Ser. No. 61/359,744 filed Jun. 29, 2010, which is incorporated herein by reference in its entirety.

BACKGROUND

Embodiments of the invention generally relate to systems and methods for collaboration, and in particular, to simultaneous game play.

People have played games for centuries. For example, board games are known to have existed in ancient Egypt. Similarly, card games are believed to have been played in China as early as the 9th century during the Tang Dynasty. Some games from these periods have survived. For example, Go—a board game originating in China some 2,000 years ago—remains popular today. Over time, thousands of different games and game types have been devised.

Currently, electronic and video games are widely popular, and by many measures the size of the video game industry now exceeds that of the motion picture industry. Further, mobile computing platforms, such as mobile telephones, personal music players and personal digital assistants, have rapidly become a popular platform for game play—for both new implementations of existing games (e.g., electronic versions of card and board games) and new games and game types. One common aspect across many games is the presence of both public and private information, relative to game play. For example, many card games are premised on each user having a different set of private cards while sharing other cards in common, such as sharing a common "draw" and "discard" pile in rummy, gin, hearts, etc., or the "hole" and "community" cards of certain variations of poker such as Texas Hold 'Em or Omaha.

SUMMARY

One embodiment of the invention includes a method for facilitating a shared activity conducted via remote devices. This method may generally include receiving an indication of a first count and a second count. The first count indicates a number of users participating in the shared activity, and the second count indicates a number of remote devices available to the users. This method may further include receiving an indication specifying a first one of the remote devices is being used by a first one of the participating users and transmitting data associated with both the shared activity and the first user to the first remote device. The first remote device is configured to render a display of the transmitted data for viewing by the first user.

In a particular embodiment, this method may further include rendering, on a shared display, information associated with the shared activity to be viewed by each of the participating users. This method may further include receiving one or more event messages from one of the remote devices, and in response, updating the information associated with the shared activity rendered on the shared display. Similarly, this method may also include receiving one or more event messages from one of the remote devices, and in response, transmitting an update to the data associated with both the shared activity and the first user to the first remote device. In such a case, the first remote device is configured update the display of the transmitted data for viewing by the first user.

In yet another particular embodiment, the method may further include receiving one or more event messages from a second one of the remote devices. The one or more event messages may include data associated with both the shared activity and the second user, and in response, data associated with both the shared activity and the second user is transmitted to the first remote device for viewing by the first user. For example, the second user performs a swiping gesture in a predetermined direction on a touch screen surface integrated with the second remote device to generate the one or more event messages from the second remote device.

In another particular embodiment, the wherein the first count is greater than the second count. That is, the number of users participating in the shared activity may exceed the number of available remote devices. In such a case, the method may also include receiving an indication specifying that the first remote device is subsequently being used by a second one of the participating users, and in response, transmitting data associated with both the shared activity and the second user to the first remote device. The remote device is configured to render a display of the transmitted data for viewing by the second user.

Additional embodiments include a computer-readable storage medium storing an application, which, when executed on a processor, performs the above recited method as well as a system having a processor and a memory storing an application program configured to facilitate a shared activity conducted via remote devices, which, when executed on the processor, performs the above recited method.

BRIEF DESCRIPTION OF THE DRAWINGS

FIGS. 5A-5B illustrates a game play environment, according to one embodiment of the invention.

DETAILED DESCRIPTION

Figure 1:
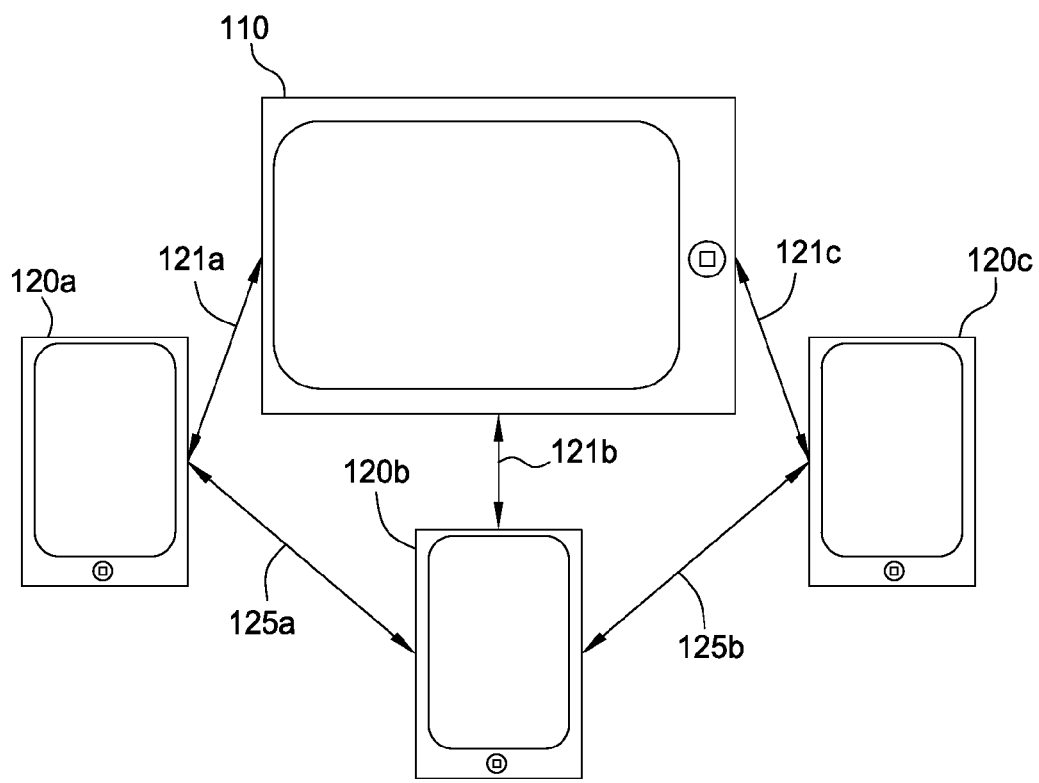
FIG. 1 is a functional block diagram of a collaborative system, according to one embodiment of the invention.

Embodiments of the invention are directed to techniques and devices that facilitate users participating in shared activities, such as interactive game play. For example, embodiments may be used to provide multiplayer electronic versions of a variety of card games or board games (or other game types). Such games may be based on existing games, such as versions of card games like poker, rummy, hearts, or based on well-known board games. Of course, embodiments of the invention may be adapted for use with new games and game-types as well, as well as for other shared activities or collaborations among multiple users.

In one embodiment, users interact with a central device and one or more handheld devices. The central device may be used to present "public" information on a central game play field—such as a game board, draw and discard piles, place cards, current scores, whose turn it is, etc. And the handheld devices are used to present "private" game information to individual players—such as a player's "hole cards" or letter tiles. Further, users may make game choices and provide game input by interacting with the handheld device. For example, the handheld device may include a touch screen surface, allowing the user to pass cards to a player by touching a card on the screen of the handheld device and swiping or flicking the card in the general direction of the player the card is being sent to. Software running on the handheld device may be configured to interpret the swipe as game input to pass the card from one player to the other. Thus, in response, the card present on one player's handheld device (as part of that player's private information) is passed to another player. In another embodiment, a user could flick the device itself to signal game input. For example, by quickly flicking the device to the left or right could be used to pass private information (e.g., one or more selected cards) to player on the left or right.

Similarly, users may make swiping (or other gestures on the touch screen or using the handheld device) to move cards (or other game items) to/from the central game play field presented on the central device. Thus, a user could discard a card at the end of a turn of rummy by swiping a desired card in the general direction of the central device or could swipe a poker chip to place or increase a bet by flicking it towards the central game play field. In these cases, software running on the handheld device (and/or the central device) may interpret the swipe as game input to discard a card from the player's hand or to increase a player's bet. In response, the central game play field could render an animation of the card or chip (or other game artifacts) "flying" in and landing on a table from the general direction of the player. Of course, the interpretation of the user input and graphical response presented on the handheld devices and the central game play field will depend on the particulars of the given game being played.

Further still, in one embodiment, the handheld devices and/or central device) may be configured to use a "pass and play" feature in cases where the number of players exceeds the number of handheld devices. For example, assume four players are playing a game of hearts, but only one handheld device is available. In such a case, each player has a set of private information—a hand of cards. The Two handheld devices could be configured to present one user's hand at a time, allowing each user to select cards to play or pass. Once a first player is done with their turn, the touch screen interface could stop displaying the cards in that player's hand the first player could hand the device to the second player. The third and fourth players could share the second handheld device in a similar manner.

Alternatively, e.g., in games where everyone needs to provide input for a "round" without requiring individual turns to occur in serial or in the same order each turn, the handheld device could be used to indicate which player next uses that handheld device. That is, the handheld device would be passed to one of the players who has not had a turn yet in that round. In one embodiment, where multiple such handheld devices are available, the central device may be configured to determine which players are assigned to a given handheld device as well as update players as to whose turn it is or determine who is using (or should next use) a given handheld device. Further, the central device could transmit a given player's private information to a handheld device each time it is that player's turn. In response, the handheld device could render an interface allowing that player to access and view their private information (e.g., their hole cards) and to provide input to continue game play. Once that player completes their turn, the handheld device is passed to the next player (at least for turn based games) or passed to another player as dictated by game play (or as indicated on the handheld or central device).

In another embodiment, each handheld device may store the private information for each player allocated to that device and transmit information to the central device as needed to facilitate game play. For example, the handheld device could store the particular hole cards for two players in a round of poker. As the round progress, the handheld device might transmit data indicating what cards the user holds to the central device only if a user stays in a hand through a complete round—making their hole cards needed to determine who wins a pot. More generally, the central device may be configured to coordinate with the handheld devices to receive, share, and/or exchange user input, private and public game information, as well as other data as needed to facilitate game play. Further, the coordination between the central device and a collection of one or more handheld devices may be implemented in a variety of ways.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 is a functional block diagram of a collaborative system. The system 100 includes a central device 110 and a number of remote devices 120a, 120b, 120c. Each of the remote devices 120a, 120b, 120c is in data communication with the central device 110 via one or more central communication links 121a, 121b, 121c. The central communication links 121a, 121b, 121c can be wired or wireless links. Each of the remote devices 120a, 120b, 120c may also communicate with one another via one or more remote communication links 125a, 125b.

Each of the remote devices 120a, 120b, 120c includes a user interface for receiving information from and transmitting information to a user. The user interface can include input and output devices such as a touch screen display, as described further with respect to FIG. 2. The central device 110 also includes a user interface for transmitting information to the users of the remote devices 120a, 120b, 120c. The user interface of the central device 110 can also receive information from one or more of the users of the remote devices 120a, 120b, 120c. The user interface of the central device 110 can include input and output devices such as a touch screen display, as described further with respect to FIG. 2.

In one embodiment, the user interface of the remote devices 120a, 120b, 120c is configured for use by a single user, whereas the user interface of the central device 110 is configured for use by multiple users, such as the users of the remote devices 120a, 120b, 120c. In one embodiment, the user interfaces of the remote devices 120a, 120b, 120c includes a display which is smaller in size than a display of the user interface of the central device 110.

In one embodiment, the remote devices 120a, 120b, 120c are physically separate from the central device 110 such that information presented by the user interface of a particular remote device 120a, 120b, 120c can be presented to the user of that particular remote device 120a, 120b, 120c and kept private and unshared with users of the remote devices 120a, 120b, 120c. Thus, the system 100 can be used to play a game as described more fully below.

Figure 2:
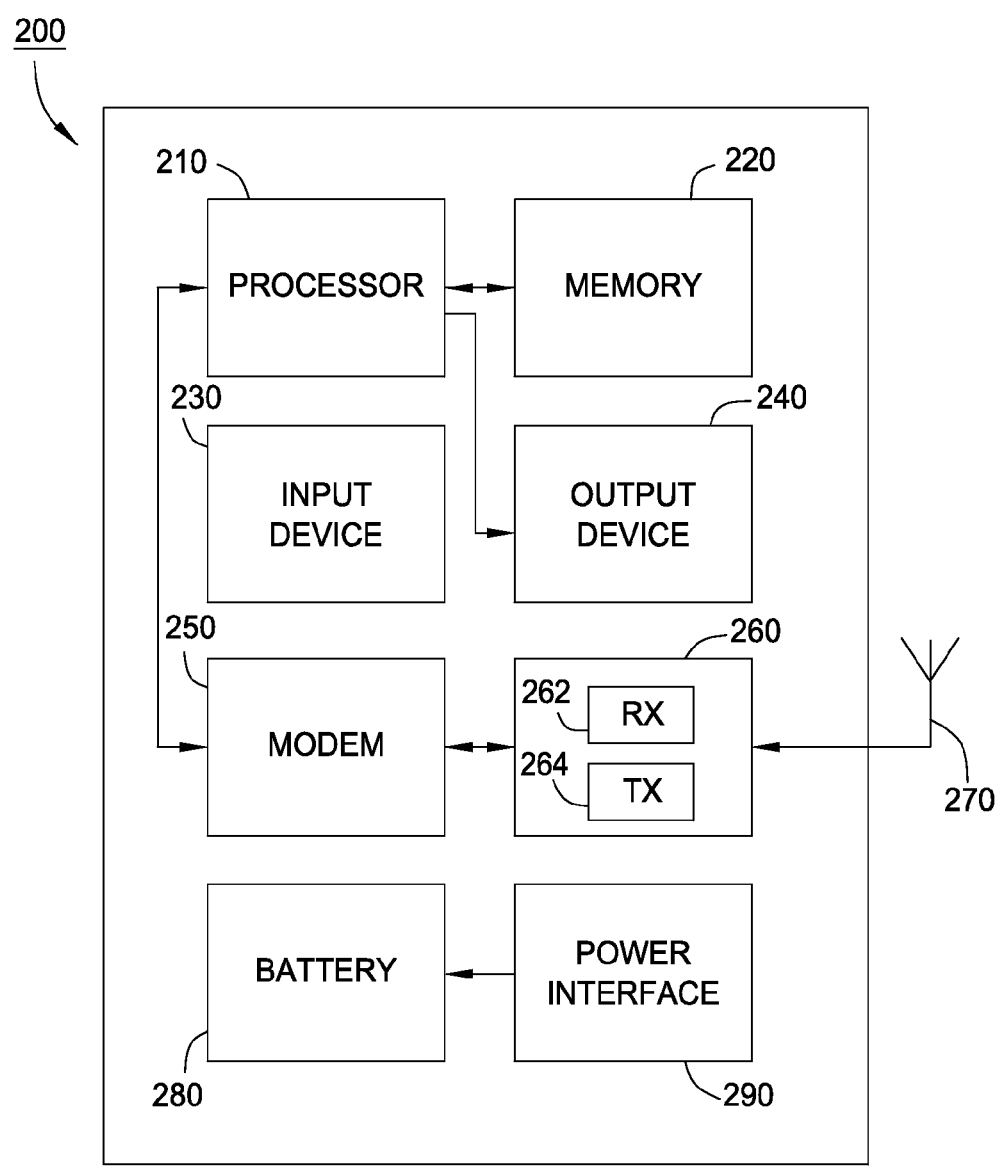
FIG. 2 is a functional block diagram of a user device that can perform the functions of a remote device or a central device, according to one embodiment of the invention.

FIG. 2 is a functional block diagram of a user device 200 that can perform the functions of a remote device or a central device. The user device 200 includes a processor 210 in data communication with a memory 220, an input device 230 and an output device 240. The processor is further in data communication with a modem 250 and a transceiver 260. The transceiver 260 is also in data communication with the modem 250 and an antenna 270. The user device 200 and components thereof are powered by a battery 280 and/or an external power source. In some embodiments, the battery 280, or a portion thereof, is rechargeable by an external power source via a power interface 290. Although described separately, it is to be appreciated that functional blocks described with respect to the user device 200 need not be separate structural elements. For example, the processor 210 and memory 220 may be embodied in a single chip. Similarly, two or more of the processor 210, modem 250, and transceiver 260 may be embodied in a single chip. Additionally, the input device 230 and output device 240 may be a single structure, such as a touch screen display.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices or non-volatile storage devices. The storage can include hard drives, solid state drives (SSDs) optical discs, such as compact discs (CDs) or digital video discs (DVDs), flash memory, and the like.

The processor 210 is also coupled to an input device 230 and an output device 240 for, respectively, receiving input from and providing output to, a user of the user device 200. Suitable input devices include, but are not limited to, a keyboard, buttons, keys, switches (or touch-screen representations of these) a pointing device, a mouse, a joystick, a remote control, an infrared detector, a video camera (coupled with video processing software to, e.g., detect hand gestures or facial gestures), a motion detector, a microphone (coupled to audio processing software to, e.g., detect voice commands), or an accelerometer. Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. The modem 250 and transceiver 260 prepare data generated by the processor 210 for wireless transmission via the antenna 270 according to one or more air interface standards. For example, each device 200 may communicate using known communication protocols, e.g., Bluetooth, 802.11 wireless networking, etc., but could also use proprietary communication protocols as well.

The modem 250 and transceiver 260 also demodulate data received via the antenna 270 according to one or more interface standards. The transceiver can include a transmitter 262, a receiver 264, or both. In other embodiments, the transmitter and receiver are two separate components. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

The user device 200 and components thereof are powered by a battery 280 and/or an external power source. The battery 280 can be any device that stores energy, and particularly any device which stores chemical energy and provides it as electrical energy. The battery 280 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform or the sun.

In some embodiments, the battery 280, or a portion thereof, is rechargeable by an external power source via a power interface 290. The power interface 290 can include a jack for connecting a battery charger, an inductor for near field wireless energy transfer or a photovoltaic panel for converting solar energy into electrical energy.

In some embodiments, the user device 200 is a mobile telephone, a personal data assistant (PDAs), a hand-held or tablet computer, a laptop computer, a GPS receiver/navigator, a camera, an MP3 player, a camcorder, a game console, a wrist watch, a clock or a television.

As mentioned above, the system 100 of FIG. 1 can be used to play a game. As a non-limiting example, use of the system 100 to play a game of Texas Hold 'Em Poker is described below. Appropriate software for performing the functionality described below can be stored by the central device 110 and/or the remote devices 120a, 120b, 120c in one or more memories 220.

At the start of a round, two hole cards are randomly dealt to each user. Each user's hole cards can be displayed on the remote device 120a, 120b, 120c of the user such that users of other remote devices 120a, 120b, 120c cannot see the card. After a round of betting, three community cards, called the flop, are dealt and displayed to all the users. The flop can be displayed on the central device 110 such that all users can see the cards. Another round of betting follows, before a fourth community card, called the turn, is dealt and a fifth community card, called the river, is dealt after another round of betting. Both the turn and river can be displayed on the central device 110 such that all users can see the cards. Following the dealing of the river, another round of betting follows before a winner is determined.

In order to bet, a user of a particular remote device 120a, 120b, 120c can select an amount to bet by inputting commands via an input device 230 of the particular remote device 120a, 120b, 120c. In one embodiment, after the amount is selected, an icon or graphic indicative of the bet is displayed on the remote device 120a, 120b, 120c of the user. Then, the user indicates that he wishes to bet that amount by performing a flicking or swiping gesture on the icon or graphic.

The flicking gesture is performed on an object by quickly dragging a finger on the screen from an object in a specific direction. The remote device 120a, 120b, 120c can detect the flicking gesture by determining the position of the user's finger over a time span and determining the direction and speed of the motion. In one embodiment, if the determined direction is within a predetermined angle threshold of a specific direction and the determined speed is above a predetermined speed threshold, the remote device 120a, 120b, 120c determines that the user has performed the flicking gesture on an object.

Figure 3:
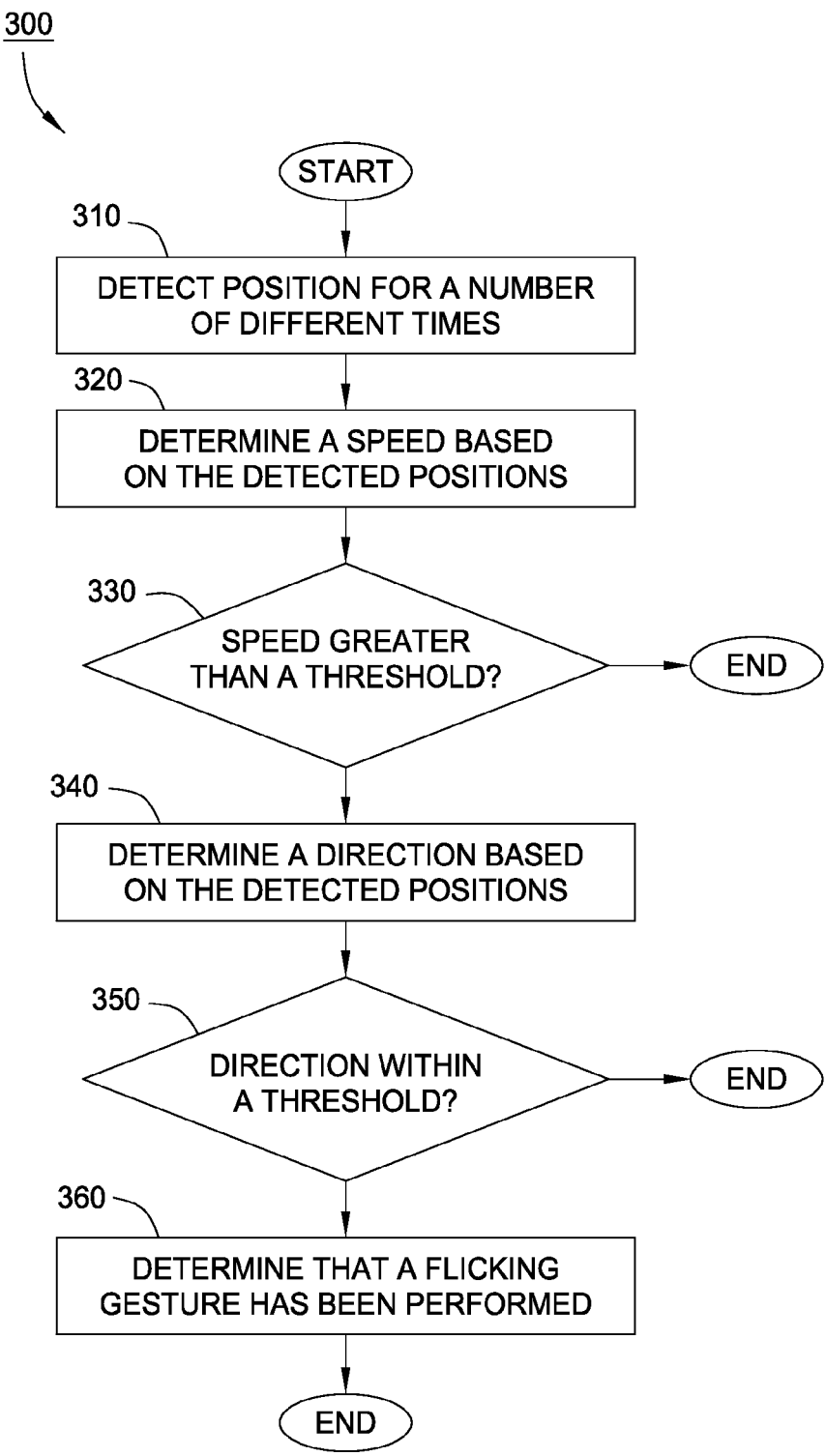
FIG. 3 is a flowchart illustrating a method of detecting a flicking gesture, according to one embodiment of the invention.

FIG. 3 is a flowchart illustrating a method of detecting a flicking gesture. The method 300 begins, in block 310 with detecting the position of a user's finger on a touch screen at a number of times. The position can be detected, for example, by the input device 230 of FIG. 2. In another embodiment, the detected position is the position of a cursor on a screen or a detected object in a video sequence. In one embodiment, the set of detected positions is a series of points, each point associated with a time and a position in an x, y coordinate space.

The method 300 continues in block 320 with determination of a speed based on the detected positions. The determination of a speed can be performed, for example, by the processor 210 of FIG. 2. In one embodiment, the speed is determined by determining a distance between a first position and a second position and dividing the distance by the difference in the times associated with the first position and the second position. Mathematically, if the first position is expressible as $(x_1, y_1)$ and is associated with time $t_1$ and the second position is expressible as $(x_2, y_2)$ and is associated with time $t_2$, then the determined speed can be $\sqrt{(x_1-x_2)^2+(y_1-y_2)^2}/|t_1-t_2|$. The first and second position can be, for example, a start position and an end position.

Next, in block 330, it is determined whether the speed is above a predetermined speed threshold. The determination can be performed, for example, by the processor 210 of FIG. 2. If the speed is not above the predetermined speed threshold, the method 300 ends and it is determined that a flicking gesture has not been performed.

If the speed is above the predetermined speed threshold, the method continues in block 340 with the determination of a direction based on the detected positions. The determination of a direction can be performed, for example, by the processor 210 of FIG. 2. In one embodiment, the direction is determined by determining an angle between a first position and a second position. Mathematically, if the first position is expressible as $(x_1, y_1)$ and is associated with time $t_1$ and the second position is expressible as $(x_2, y_2)$ and is associated with time $t_2$, then the determined speed can be $\tan^{-1}((y_2-y_1)/(x_2-x_1))$, wherein $\tan^{-1}$ is the arctangent function. The first and second position can be, for example, a start position and an end position.

Next, in block 350, it is determined whether the direction is within a predetermined angle threshold of a specific angle. The determination can be performed, for example, by the processor 210 of FIG. 2. In one embodiment, it can be determined, sequentially or in parallel, whether the direction is within a predetermined angle threshold of multiple angles, such as up, down, left and right. If the direction is not within the predetermined angle threshold of any specific angle, the method 300 ends and it is determined that flicking gesture has not been performed.

If the direction is within the predetermined angle threshold, the method continues to block 360 where it is determined that a flicking gesture has been performed. The determination can be performed, for example, by the processor 210 of FIG. 2. In one embodiment, it is determined in which direction the flicking gesture has been performed. In one embodiment, it is determined upon which object the flicking gesture has been performed. For example, an object having a location close to a start position may be determined as the object upon which the flicking gesture has been performed.

In one embodiment, it can be determined that a flicking gesture has been performed only if the gesture was straight by determining if the minimum mean squared error (MMSE) of the positions fitted to line between a first and second position is below a straightness threshold. In one embodiment, it can be determined that a flicking gesture has been performed only if the gesture was long by determining if a distance between a first a second position is above a distance threshold. In one embodiment, it can be determined that a flicking gesture has been performed only if the gesture was continuous by determining if the number of positions between a first and second position is above a density threshold.

Once it is determined that flicking gesture has been performed, the method 300 ends. In one embodiment, the method 300 outputs a indication of the determination that a flicking gesture has been performed. In one embodiment, the method 300 outputs an indication of the direction of the flicking gesture and/or an object upon which the flicking gesture has been performed.

As described above, the system 100 can be used to play a game, such as Texas Hold 'Em Poker. The system 100 can be used to play other games, including games in which cards (or other private game information, objects, pieces, or elements) are passed from one player to another. For example, in one variation of the game of Hearts, four players are each dealt a hand of 13 cards. Each player's hand can be displayed on a remote device 120a, 120b, 120c associated with that user such that other players cannot see the player's hand. After the cards have been dealt, each player selects three cards that are "passed" to another player. In one embodiment, each player selects three cards by touching graphic representations of the cards and then passes the cards by performing a flicking gesture towards the left or right. Play continues which each player selecting a card for play on his turn. In one embodiment, a player selects the card to be played by performing an upwards flicking gesture on a graphical representation of the card. The card is removed from the display of the remote device 120a, 120b, 120c of the user and displayed by the central device 110.

As described above, in one embodiment, when a flicking gesture is determined, a speed and direction of the flicking gesture are determined. In one embodiment, an elevation angle is also determined based on the orientation of the remote device 120a, 120b, 120c upon which the flicking gesture was performed. In one embodiment, the remote device 120a, 120b, 120c includes an accelerometer which can be used to determine an angle with the ground of the remote device 120a, 120b, 120c.

The system 100 can be used to play a coin-toss game in which the remote device 120a, 120b, 120c displays one or more graphical representations of coins and the central device 110 displays a graphical representation of a cup, a hat, or other receptacle. Users of the remote device 120a, 120b, 120c play the game by orienting the remote device 120a, 120b, 120c towards the central device 110 and performing flicking gestures on the displayed coins. For each flicking gesture performed, a speed, direction and elevation angle is determined. The remote device 120a, 120b, 120c communicates the determined speed, direction, and ground angle with the central device 110 which determines whether or not the coin has been "flicked" into the receptacle. The coin is removed from the display of the remote device 120a, 120b, 120c of the user and displayed by the central device 110 as either in the receptacle or having missed the receptacle.

Many games that can be played using the system 100 allow for a selectable number of players to participate. In some cases, the number of users desiring to play the game may be more than the number of remote devices 120a, 120b, 120c. For example, if there are four users desiring to play the game and only three remote devices 120a, 120b, 120c, each user would not have a dedicated remote device 120a, 120b, 120c. In such a case, users may wish to share the remote device without allowing other users sharing the device to see the information presented to a particular user while still allowing all users to see information displayed by the central device 110.

Figure 4:
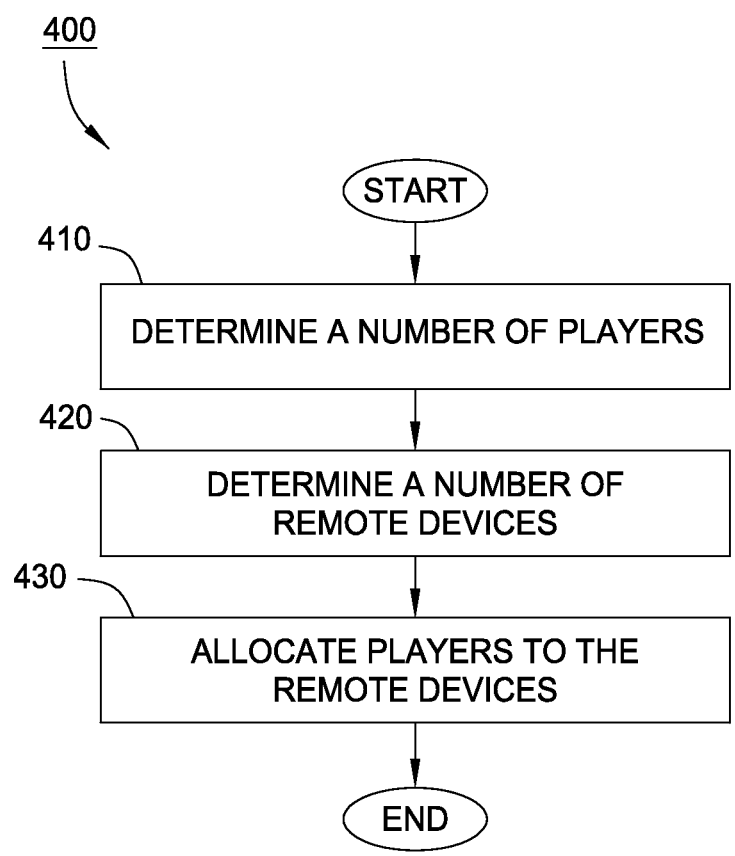
FIG. 4 is a flowchart illustrating a method of allocating players amongst remote devices, according to one embodiment of the invention.

The system 100 can be configured to allow more players than remote devices 120a, 120b, 120c through a pass-and-play functionality. FIG. 4 is a flowchart illustrating a method of allocating players among remote devices. The method 400 begins in block 410 with the determination of a number of players. The determination can be performed, for example, by the processor 210 of FIG. 2 based on input received via the input device 230. The method 400 continues to block 420 with the determination of a number of remote devices. The determination can be performed, for example, by the processor 210 of FIG. 2 based on input received via the input device 230 or based on the number of remote devices 120a, 120b, 120c currently associated with the central device 110 via the central communication links 121a, 121b, 121c.

Next, in block 430 players are allocated among the remote devices. The players can be allocated by the processor 210 of FIG. 2 automatically or in accordance with input received via the input device 230. The allocation involves associating one or more players with each remote device. In cases in which there are more players than remote devices, at least one of the remote devices will be associated with two or more players. In one embodiment, the players are allocated automatically such that the maximum number of players associated with any particular remote device is minimized.

Once players have been allocated, the method 400 ends and game play can begin. For users sharing a remote device, the remote device can display a player indicator and require player input prior to displaying private information intended for that player (e.g., that players "hole cards" in a game of poker). In one embodiment, the remote device can display a first player indicator and require input before displaying information intended for the first player. When the first player has completed his turn, he can input an indication that his turn is complete and the remote device can display a second player indicator and require input before displaying information intended for the second player.

Alternatively, rather than allocate users to devices statically prior to game play, in one embodiment, users are dynamically allocated a remote device as needed during game play. In such a case, the private information for each player participating in a game may be stored on the central device 110 and transmitted to a given remote device each time a different user takes a turn with that remote device. For example, some games may involve game play which depend on task-based turns (as opposed to order based turns), in such a case, the central device 110 may monitor which users have (and have not) completed a task-based turn and indicate which player should next receive a remote device 120 after a user finishes their turn. In other games, game play guides the order of user turns. In such cases, the central device 110 may respond to signaling from the remote devices about which player then currently possesses a given remote device and provide private information to a remote device as appropriate. Once the next player receives the remote device, it may signal the central device to send the private information associated with the next player to that device. This process repeats until each user has completed a turn and until game play is complete.

As shown in FIG. 1, discussed above, one embodiment of the invention includes a central device 110, such as a handheld tablet communicating with remote devices 120, such as one or more mobile telephones, to provide a game play experience that presents players with both public information (on the central device 110) and with private information (on the one or more remote devices 120). Further, a player may interact with a touch screen interface on a given remote device 120 to send private information to another player, e.g., by performing flicking or swiping motions to send elements of private data game to another player.

Figure 5A:
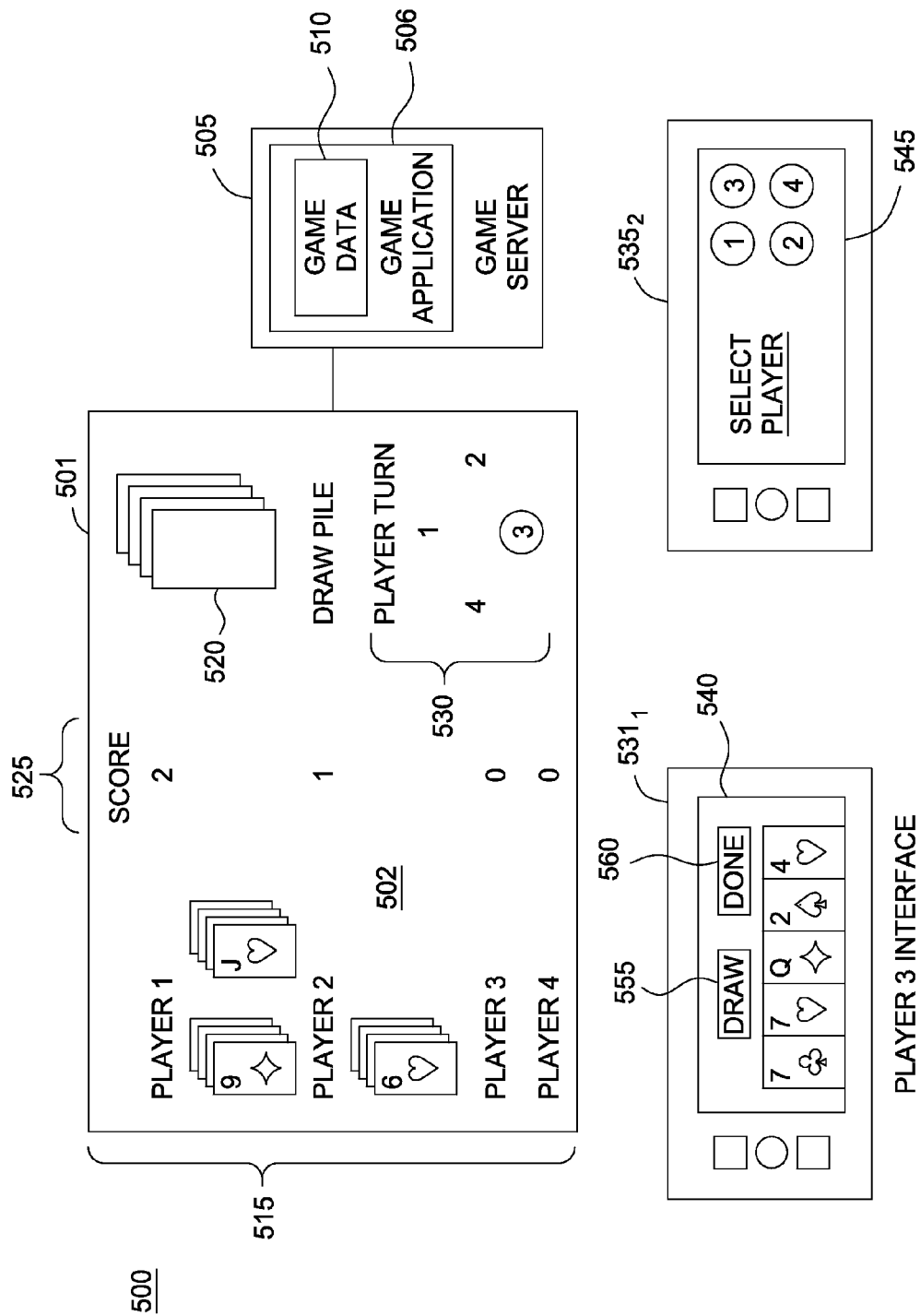

In an alternative embodiment, a central device 110, such as a home theater PC or a set-top device may be used in conjunction with a display and one or more mobile devices to provide a similar game play experience. For example, FIGS. 5A and 5B illustrates a game play environment 500, according to one embodiment of the invention. As shown in FIG. 5A, a display 501 (such as an LCD or plasma television) shows a central game play field 502 for an electronic version of the card game, "go fish." The display 501 receives display images for the game play field 502 from a game server 505, such as a home theater PC, set-top box, game console, or video streaming device. The game server 506 is capable of executing a game application 506 in conjunction with multiple remote devices 535, such as one or more mobile telephone devices each configured with an application (or "app") for the game to be played. In turn, the game application 506 is configured to coordinate multiuser game play by sending and receiving game data 510 from remote devices 535, as well as updating the game play 502 presented on display 501 as game play progress. Further, the game application 506 may be further configured to coordinate and/or manage the use of remote devices 535 by game players, particularly when there are more players then available remote devices 535.

In this specific example, four players use two remote devices $535_{1-2}$ to engage in a game of "go fish." "Go fish" is a well-known card game where turn-order depends on what happens during game play. Assume for this discussion that "go-fish" is played according to the following rules: five cards are dealt to each of four players and the remaining cards are placed face down in a draw pile. A random player is chosen to go first. That player then asks another player for a specific card. For example, player 1 could say to player 2, "please give me your 9s." If player 2 held any of the requested cards (i.e., any 9s), they turn them over to player 1. Further, if player 1 does receive a card (or cards) from player 2, then player 1 continues their turn. That is, player 1 gets to again ask one of the other players for another card. If player 2 does not have the requested card, they say, "go fish" to the requesting player (player 1), who then draws the top card from the draw pile. If player 1 happens to draw the card that was asked for (i.e., a 9), they continue their turn. However, if the player does not draw the target, it becomes the turn of the player who said "go fish" (i.e., player 2). When a player collects all four cards of the same rank, they place those cards in front of themselves. In some variations of "go fish," the cards are placed face down, however, for this example, cards collected by each player are presented to all players on a central game play field 502. The game of "go fish" continues until either someone has no cards left in their hand or the draw pile runs out. The winner is the player who collects the most sets of four cards.

In one embodiment, user interface mechanics provided by the game application 506 and remote devices 535 allow users to play "go fish" in game environment 500, including when there are more players than remote device. Further, the user interface mechanics allow the remote devices to be used by the players in any order, as determined by game play. Remote devices $535_{1-2}$ generally correspond to the user device 200, as described in FIG. 2. Thus, each remote device 535 may provide a game application (or "app") stored in a memory and executed on a processor. Further, each remote device 535 may include a touch screen interface used to receive game input from the game participants.

As shown, the game play field 502 provides a graphic 530 that shows which player is the current player, a graphic 520 that shows a draw pile of cards. The graphic 520 provides users with a general idea of how many cards are left in the draw pile as game play progresses. Game play field 502 also shows the current score 525 for each player as well as a graphic 515 showing what cards each player has collected. In this example, it is currently player 3's turn, player 1 has collected the 9s and jacks, while player 2 has collected the 6s. Players 3 and 4 have not collected any cards.

Remote device $535_1$ shows a "current player" interface 540. Interface 540 shows the cards in player 3's hand at this example point of game play. Interface 540 also includes a draw button 555 and a done button 560. Remote device $535_2$ shows a "select player" interface 545 that does not show the private information of any of the four players. In the "go fish" example, the select player interface 545 is presented when a user is done "fishing" as the current player or after a target player turns over cards to the current player (or tells the current player to "go fish"). More generally, as users engage in game play, and different users need access to their private game data (regardless of what game is played), the select player interface 545 allows players to share the remote devices 535 among themselves without sharing private game information. Note, while players are identified using numbers in this example, the users could also "sign in" to play using their names, nicknames, avatar icons, etc. In such a case, the game data 510 would include each user's name and the game play field 502 could show the approbation graphics to identify the players as part of graphic 530. Further, the "select player" interface 545 could use the same graphics (e.g., player's name) to show the list of game participants.

Illustratively, game play field shows that it is currently player 3's turn. Accordingly, player 3 asks a target player for cards of a specified rank. The target player then uses the remote device $535_2$ to access their private information associated with game play (i.e., the cards currently held by the target player). For example, FIG. 5B shows the select player interface 540 on remote device $535_2$. Assume for this example, that player 3 asks player 4 if they have any 7s. In such a case, player 4 takes remote device $535_2$ and presses the number "4" on interface 545. In response, the game application 506 sends the game data 510 to remote device 535 corresponding to the private information of player 4; namely, the cards in player 4's hand. For example, a target player interface 550 shows the cards present in player 4's hand, a done button 565 a "go fish" button 570, and a directional graphic 575. When asked for cards, player 4 can tell the current player to "go fish" using button 570. However, if the target player has one (or more) of the requested cards, the touch screen on remote device $535_2$ may be used to send the cards to the "fishing" player by swiping or flicking a card on the touch screen in the general direction of the requesting player (as indicated by graphic 575). Continuing with the present example, player 3 asks player 4 whether she has any 7s. As player 4 has both the seven of spades and the seven of diamonds, player 4 the turns these cards over to player 3. Specifically, player 3 touches the seven of spades and the seven of diamonds (or both) to select these card(s) and then performs a flicking or swiping motion by quickly dragging a finger across the interface 440 from left-to-right (i.e., in player 3's direction as indicated using the graphic 575). The remote device can detect the flicking gesture using the techniques of method 300 described above for user device 200.

In response, the remote device $535_2$ signals the game application 506 that these cards should be removed from the private information of player 4 and stored in the private information of player 3 as well as removes the graphic of the seven of spades and the seven of diamonds from the interface 550. Additionally, the game application 506 updates the game data 507 to reflect these two cards being turned over to player 3, and signals remote device $535_1$ to update the presentation of private information for player 3 on interface 540. The game application 506 also takes care of updating the game play field 502 as appropriate for the game being played and the events that occur during game play. In this example, when player 4 turns over the seven of spades and the seven of diamonds to player 3, player 3 has all four 7s. Accordingly, the game application 506 updates the graphic 515 to show the 7s in player 3's row and updates the score 525 displayed for player 3. Further, the remote device $535_1$ removes the display of the sevens from the display the on current player interface 540.

If player 3 did not have both the seven of clubs and the seven of hearts, then the interface 540 would be updated accordingly. For example, assume player 3 only had the seven of clubs. In such a case, the current player interface 540 would be updated to present the seven of clubs along with the seven of spades and the seven of diamonds. Once the game application 506 and the remote devices 535 update the current game state, player 3 continues their turn.

The draw button 555 is used when the current player is told to "go fish" by another player. For example, assume player 3 had gone "fishing" for queens from player 4 instead of for sevens. In such a case, player 4 would respond by telling player 3 to "go fish" and press the "go fish" button 570 on interface 550. In response, player 3 presses the draw button 555, the remote device $535_1$ sends a message to the game application 506, which responds by selecting a card not currently in play and adds it to the private information associated with the player 3. In addition, the current player interface 540 is updated to present the drawn card. If the "drawn" card is the one the player was "fishing" for (i.e., a queen), then the current player continues their turn and asks a player for a card. The game application 506 may also update the game play field 502 as appropriate (e.g., if the current player is told to "go fish" and happened to draw the fourth card for a given card rank).

Otherwise, if the current player does not receive the card they are "fishing" for when drawing a card, it becomes the turn of the player who told the current player to "go fish." In the present example, if player 3 presses the "done" button 560 on interface 540 to signal the game application that their turn was complete. In response, the game application 506 would update the graphic 530 to reflect the player who has the next turn. In this example, game application 506 could identify which player has the next turn from the combination of a "go fish" button being pressed by a target player followed by the "draw" button 555 and the "done" button 560 being pressed by the current player. Game play would then continue until complete. As game play proceeds the remote devices 535 return to the select player interface 540 each time a user is done, either as the current player or as the target of a "fishing" request for cards. Thus, as described, the game play application 506 and remote devices 535 coordinate game play in order to manage and display the public and private game elements as the players they interact with the remote devices 535 to play the "go fish" card game.

Figure 6:
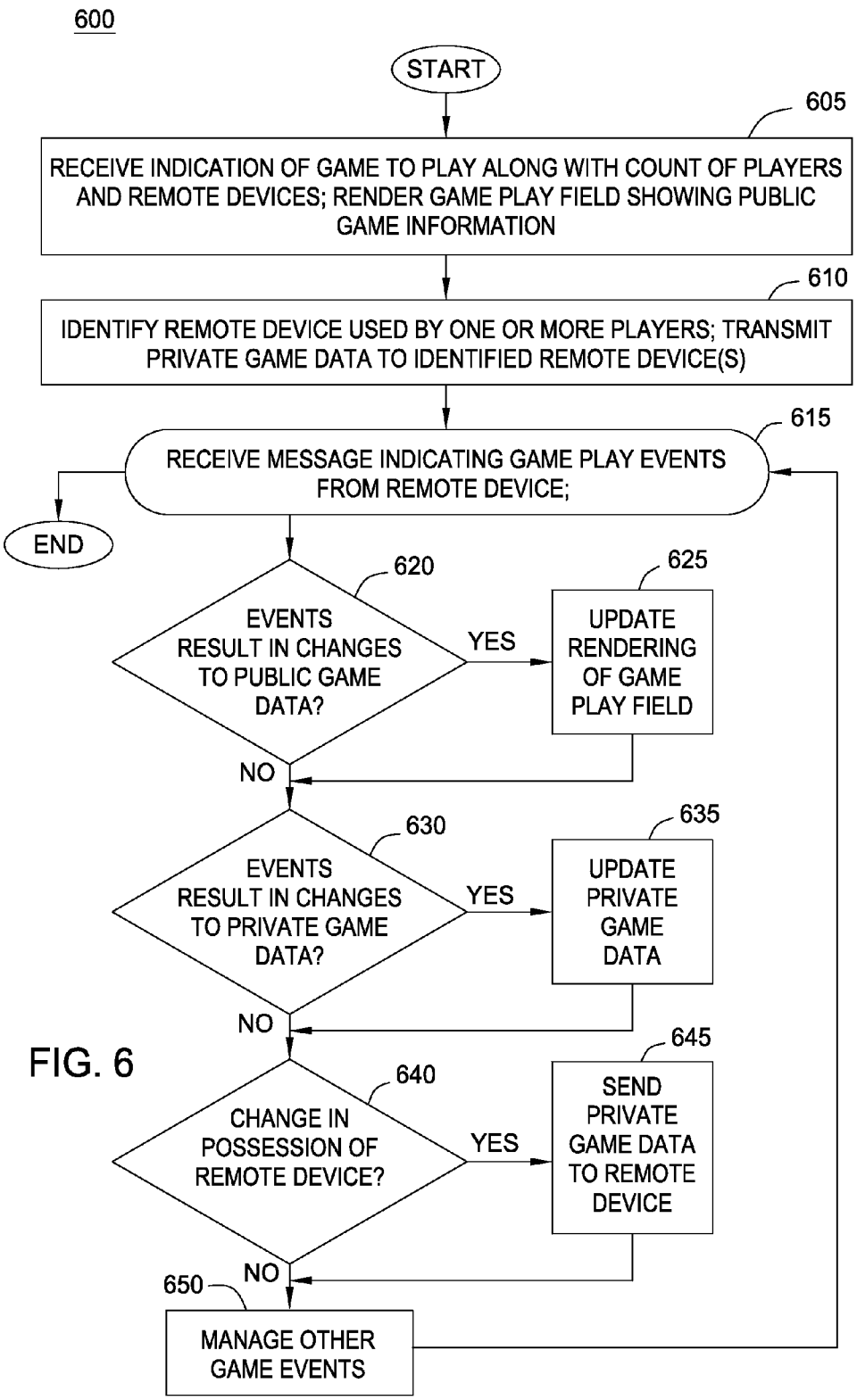
FIG. 6 is a flowchart illustrating a method for a game application to coordinate and/or manage the use of remote devices by game players, particularly when there are more players then available remote devices, according to one embodiment of the invention.

FIG. 6 illustrates a method 600 for a game application to coordinate and/or manage the use of remote devices by game players, particularly when there are more players then available remote devices, according to one embodiment of the invention. As shown, the method 600 begins at step 605, where, prior to initiating game play, users specify what game to play along with a count of players and a count of remote devices. Similarly, users could also specify game elements for use during game play such as user names, avatars, or specify to retrieve game stats from prior games, or continue a game previously saved in progress, etc.

At step 610, the game application identifies a remote device being used by one or more specific players. In response, the game application may transmit each such player's private game data or private game elements to the corresponding remote device. For example, as described above, to play "go fish" the game application renders the common game play field on a display monitor or on the touch screen of a tablet device, "deals" cards to each player (stored as game data by the game application), and selects one of the players as the current player. In turn, that player uses one of the remote devices to access their private data, the cards dealt to them. Once game play begins, the game application and remote devices begin exchanging messages to effectuate game play. At step 615, the game application receives messages indicating the occurrence of game play events relevant for the game being played.

At step 620, the game application determines whether a game play event has occurred that results in changes to public game data. If so, the game application updates the rendering of the game play field (step 625). For example, a player could collect all four cards of a given rank while playing "go fish," or a player could use the remote device to make or increase a bet (or fold) during a round of poker.

At step 630, the game application determines whether a game play event has occurred that results in changes to private game data. If so, the game application updates the private game data stored by the game application. For example, a player could send a message requesting to draw a card after being told to "go fish." Or the game application could receive a message from one player to transfer (or share) elements of private game data with another player. For example, a player could turn over cards requested by the current player during a game of "go fish." Other examples could include team based games where two (or more) users share private game elements with one another.

More generally, in all of these cases, when game play events change the state of private game data, the game application updates the game data stored by the application. Further, the game application and may send messages to the remote devices to update the private data presented on a given remote device. Note, however, if the private data changes for a player that is not currently using one of the remote devices, then the game application updates the private game data stored by the game application, but does not send any messages to the remote devices. For example, assume one user transfers (or shares) an element of private game data (such as a playing card) with another, but the player to whom the data is transferred is not currently using one of the remote devices. In such a case, the game applications updates the second player's private game data, and when the second user subsequently interacts with one of the remote devices, then sends the updated private game data.

At step 640, the game application determines whether a game play event indicates a change in possession for one of the remote devices. If so, the game application sends the appropriate player's private game data or private game elements to the corresponding remote device. At step 650, the game application may manage other game events, e.g., requests to restart or quit a given gaming session, etc. The method 600 then returns to step 615 to process subsequent game event messages received from the remote devices, until game play completes.

As described above, one embodiment involves a system including a central device which can be used as a playing field and remote devices used by one or more players. The central device can display cards to be drawn, cards that have been played, a score, an indication of player turn, etc. The remote devices can include functionality for drawing cards, playing cards, passing cards, etc. Although embodiments described above has involved game play with cards, it is to be appreciated that the system can play other games, such as involving coins, tiles, other objects, or simply information. Such a system allows simultaneous play by multiple players, allowing each player to take time examining the information presented without delaying others. Although embodiments describe above have involved a system used for playing a game, it is to be appreciated that the system can be used for non-entertainment purposes as well, such as in negotiations or project collaboration or other shared activities.

While the above description has pointed out novel features of the invention as applied to various embodiments, the skilled person will understand that various omissions, substitutions and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A method for facilitating a shared activity conducted via remote devices, comprising:
   receiving an indication of a first count and a second count, wherein the first count indicates a number of users participating in the shared activity and wherein the second count indicates a number of remote devices, each having a touch screen display, available to the users, wherein the first count exceeds the second count;
   receiving an indication specifying a first one of the remote devices is being used by a first one of the participating users;
   transmitting data associated with the first user to the first remote device, wherein the first remote device is configured to render a display of the transmitted data for viewing by the first user on the touch screen display;
   in response to receiving an indication specifying the first user has completed using the first remote device, removing the data associated with the first user from the touch screen display of first remote device;
   receiving an indication specifying the first one of the remote devices is being used by a second one of the participating users; and
   transmitting data associated with the second user to the first remote device, wherein the first remote device is configured to render a display of the data associated with the second user for viewing by the second user on the touch screen display.

2. The method of claim 1, further comprising:
   rendering, on a shared display, information associated with the shared activity to be viewed by each of the participating users.

3. The method of claim 2, further comprising:
   receiving one or more event messages from one of the remote devices; and
   in response, updating the information associated with the shared activity rendered on the shared display.

4. The method of claim 2, further comprising:
   receiving one or more event messages from one of the remote devices; and
   in response, transmitting an update to the data associated with either the shared activity or one of the participating users to the first remote device, wherein the first remote device is configured update the display of the transmitted data for viewing on the touch screen display of the first remote device.

5. The method of claim 2, further comprising:
   receiving one or more event messages from a second one of the remote devices, wherein the one or more event messages include data associated with either the shared activity or a third user; and
   in response, transmitting the data associated with either the shared activity or the third user to the first remote device for viewing on the touch screen display of the first remote device.

6. The method of claim 5, wherein the third user performs a swiping gesture in a predetermined direction on a touch screen surface integrated with the second remote device to generate the one or more event messages sent from the second remote device.

7. The method of claim 2, wherein each of the remote devices is a handheld device having a processor, a memory, and an application program used to conduct the shared activity.

8. The method of claim 1, wherein the shared activity comprise a game played by the users.

9. The method of claim 1, wherein the first count is greater than the second count.

10. A computer readable storage medium storing one or more applications, which, when executed on a processor, performs a first operation for facilitating a shared activity conducted via remote devices, the first operation comprising:
   receiving an indication of a first count and a second count, wherein the first count indicates a number of users participating in the shared activity and wherein the second count indicates a number of remote devices, each having a touch screen display, available to the users, wherein the first count is greater than the second count;
   receiving an indication specifying a first one of the remote devices is being used by a first one of the participating users;
   transmitting data associated with the first user to the first remote device, wherein the first remote device is configured to render a display of the transmitted data for viewing by the first user on the touch screen display;
   in response to receiving an indication specifying the first user has completed using the first remote device, removing the data associated with the first user from the touch screen display of first remote device;
   receiving an indication specifying the first one of the remote devices is being used by a second one of the participating users; and
   transmitting data associated with the second user to the first remote device, wherein the first remote device is configured to render a display of the data associated with the second user for viewing by the second user on the touch screen display; and rendering, on a shared display, information associated with the shared activity to be viewed by each of the participating users.

11. The computer readable storage medium of claim 10, further comprising:
receiving one or more event messages from one of the remote devices; and
in response, performing a second operation comprising at least one of:
(i) updating the information associated with the shared activity rendered on the shared display, and
(ii) transmitting an update to the data associated with either the shared activity or the first user to the first remote device, wherein the first remote device is configured update the display of the transmitted data for viewing by the first user.

12. The computer readable storage medium of claim 10, further comprising:
receiving one or more event messages from a second one of the remote devices, and wherein the one or more event messages include data associated with one of the shared activity and a third user, wherein the third user performs a swiping gesture in a predetermined direction on the touch screen display integrated with the second remote device to generate the one or more event messages from the second remote device; and
in response, transmitting the data associated with either the shared activity or the third user to the first remote device for viewing on the touch screen display of the first remote device.

13. The computer readable storage medium of claim 10, wherein each of the remote devices is a handheld device having a processor, a memory, and an application program used to conduct the shared activity.

14. The computer readable storage medium of claim 10, wherein the shared activity comprise a game played by the users.

15. A system, comprising:
a processor; and
a memory storing an application program, which, when executed on the processor, performs an operation for facilitating a shared activity conducted via remote devices, the operation comprising:
receiving an indication of a first count and a second count, wherein the first count indicates a number of users participating in the shared activity and wherein the second count indicates a number of remote devices, each having a touch screen display, available to the users, wherein the first count exceeds the second count,
receiving an indication specifying a first one of the remote devices is being used by a first one of the participating users,
transmitting data associated with the first user to the first remote device, wherein the first remote device is configured to render a display of the transmitted data for viewing by the first user on the touch screen display,
in response to receiving an indication specifying the first user has completed using the first remote device, removing the data associated with the first user from the touch screen display of first remote device,
receiving an indication specifying the first one of the remote devices is being used by a second one of the participating users, and
transmitting data associated with the second user to the first remote device, wherein the first remote device is configured to render a display of the data associated with the second user for viewing by the second user on the touch screen display.

16. The system of claim 15, wherein the operation further comprises rendering, on a shared display, information associated with the shared activity to be viewed by each of the participating users.

17. The system of claim 16, wherein the operation further comprises:
receiving one or more event messages from one of the remote devices; and
in response, performing a second operation comprising at least one of:
(i) updating the information associated with the shared activity rendered on the shared display, and
(ii) transmitting an update to the data associated with either the shared activity or the first user to the first remote device, wherein the first remote device is configured update the display of the transmitted data for viewing by the first user.

18. The system of claim 15, wherein the operation further comprises:
receiving one or more event messages from a second one of the remote devices, and wherein the one or more event messages include data associated with one of the shared activity and a third user, wherein the third user performs a swiping gesture in a predetermined direction on the touch screen display integrated with the second remote device to generate the one or more event messages from the second remote device; and
in response, transmitting the data associated with either the shared activity or the third user to the first remote device for viewing on the touch screen display of the first remote device.

19. The system of claim 15, wherein the shared activity comprise a game played by the participating users.

* * * * *